Figure 1:
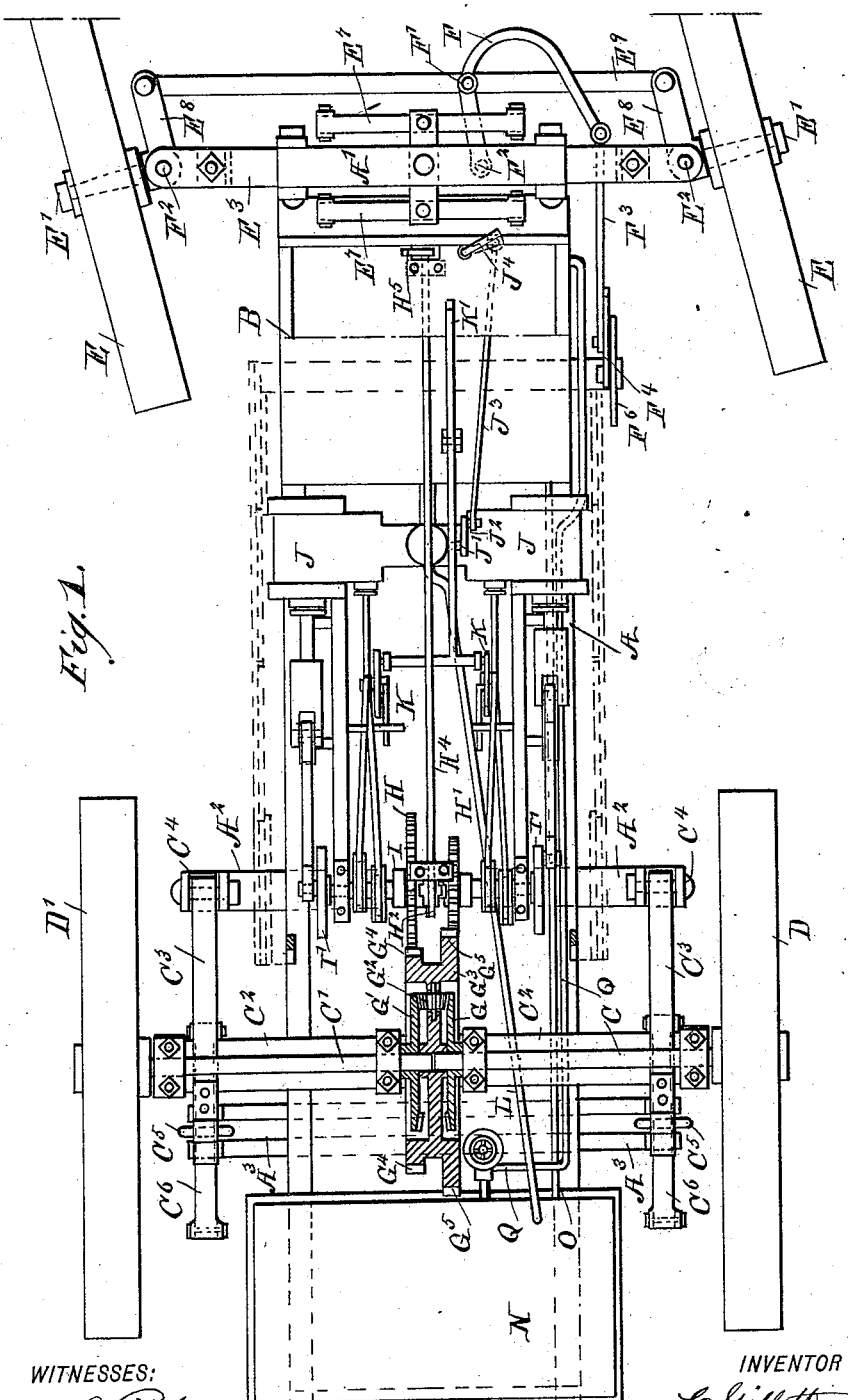

(No Model.) 3 Sheets—Sheet 1.

C. GILLETT.
ROAD WAGON.

No. 493,082. Patented Mar. 7, 1893.

WITNESSES:

INVENTOR
C. Gillett
BY Munn & Co.
ATTORNEYS.

(No Model.) 3 Sheets—Sheet 2.
C. GILLETT.
ROAD WAGON.
No. 493,082. Patented Mar. 7, 1893.
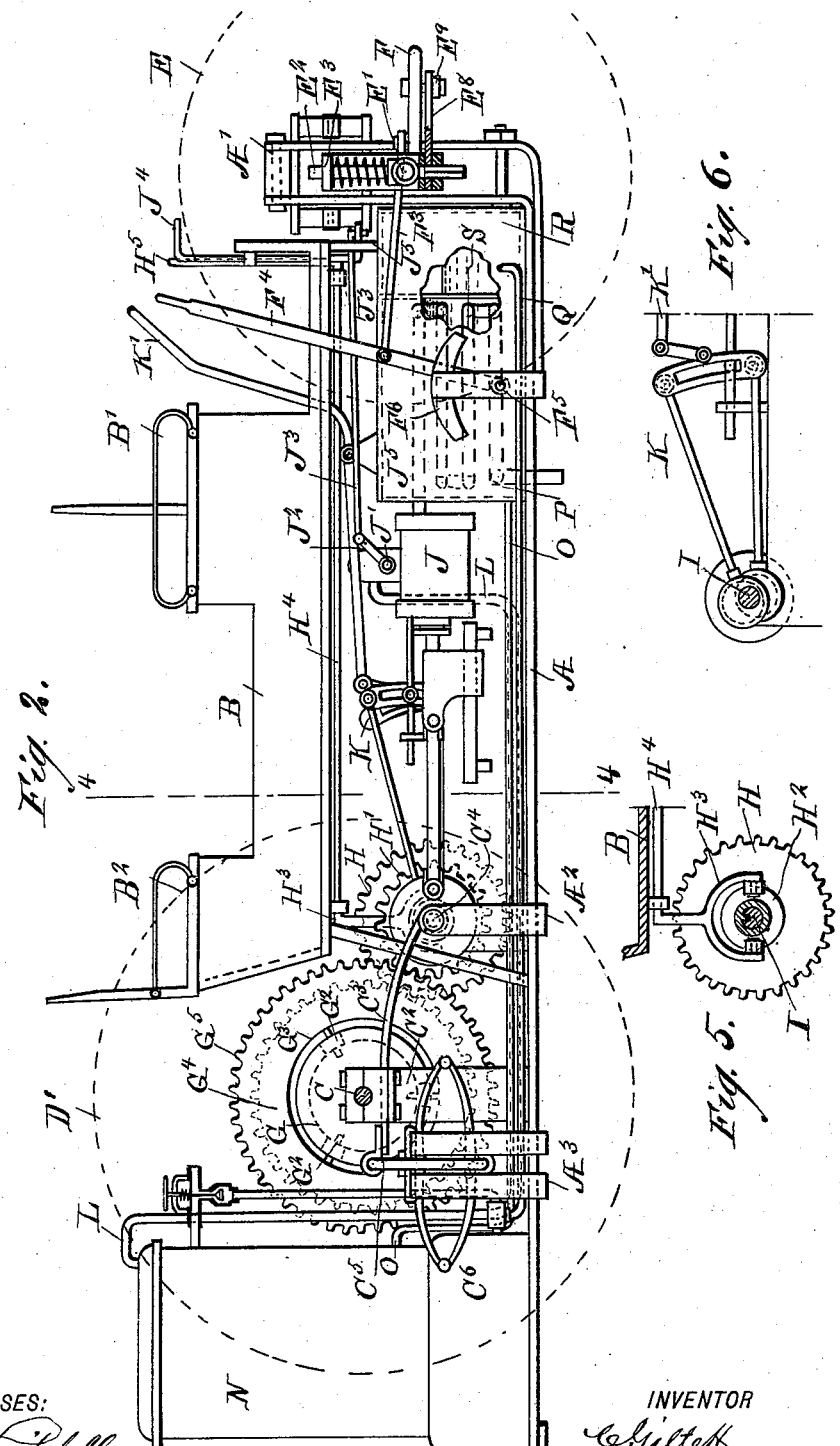
WITNESSES:
INVENTOR
ATTORNEYS.

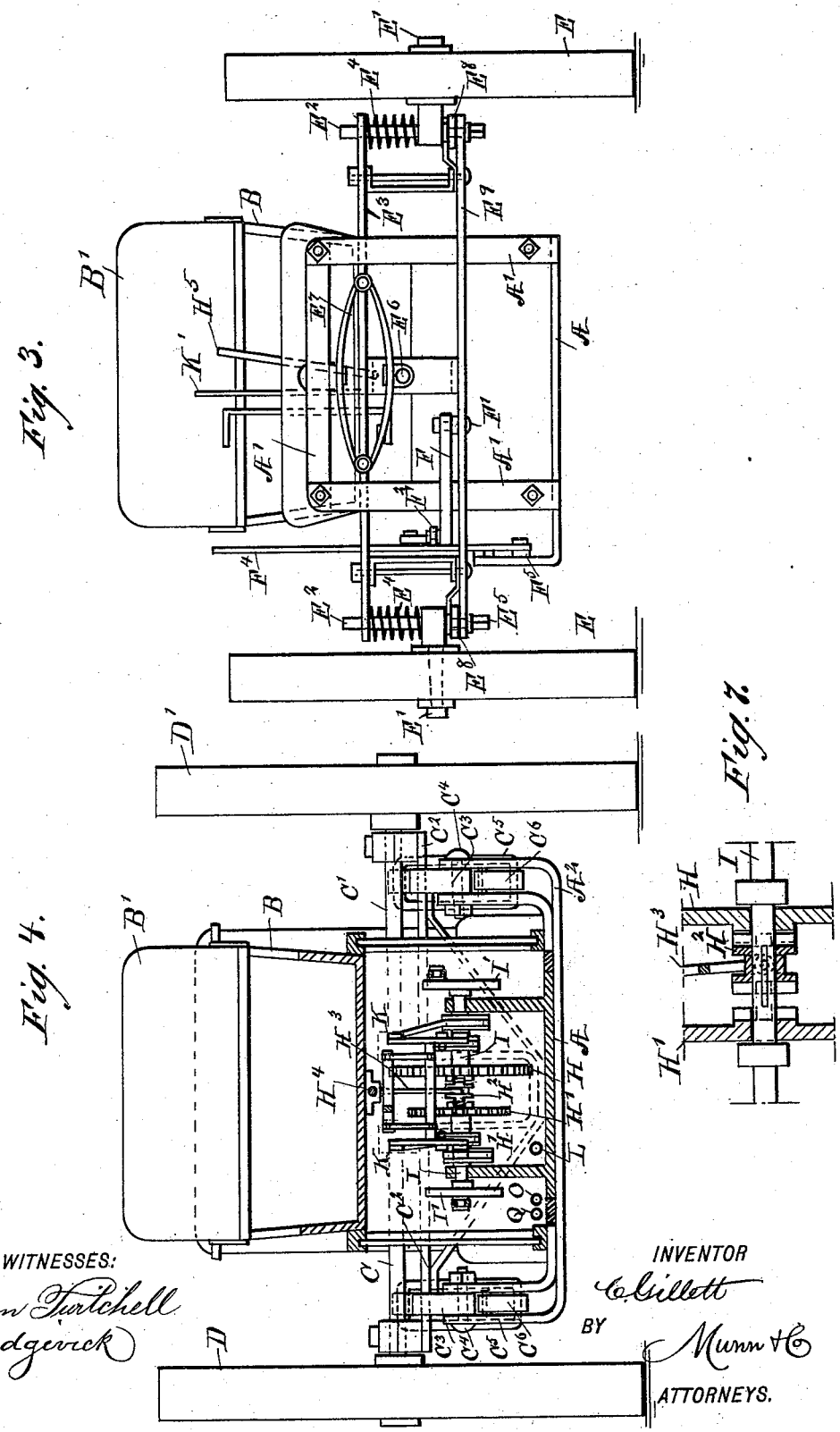

UNITED STATES PATENT OFFICE.

CLARENCE GILLETT, OF GLOVERSVILLE, NEW YORK.

ROAD-WAGON.

SPECIFICATION forming part of Letters Patent No. 493,082, dated March 7, 1893.

Application filed November 22, 1892. Serial No. 452,794. (No model.)

*To all whom it may concern:*

Be it known that I, CLARENCE GILLETT, of Gloversville, in the county of Fulton and State of New York, have invented a new and Improved Road-Wagon, of which the following is a full, clear, and exact description.

The invention relates to traction vehicles, propelled by a motive agent, such as steam, compressed air, electricity, &c.

The object of the invention is to provide a new and improved road wagon, which is simple and durable in construction, very effective in operation, and readily propelled at a high rate of speed and steered in any desired direction.

The invention consists of certain parts and details and combinations of the same, as will be hereinafter described and then pointed out in the claims.

Reference is to be had to the accompanying drawings forming a part of this specification, in which similar letters of reference indicate corresponding parts in all the figures.

Figure 1 is a plan view of the improvement with parts in section. Fig. 2 is a side elevation of the same with parts in section and parts removed. Fig. 3 is a front end view of the improvement. Fig. 4 is a transverse section of the same on the line 4—4 of Fig. 2. Fig. 5 is a sectional side elevation of the gear shifting mechanism. Fig. 6 is a side elevation of the reversing mechanism; and Fig. 7 is an enlarged transverse section of the transmitting gear on the main shaft.

The improved road wagon is provided with a suitably-constructed bed plate A, supporting a wagon body B, provided with suitable front and rear seats B', and B², for carrying the driver and passengers, or freight, if desired. The rear end of the bed plate A supports a rear axle made in two parts C and C', on the outer ends of which are fastened the hind wheels D and D' respectively, but both are journaled in suitable bearings in a transversely-extending frame C², connected near each outer end with a spring plate C³ attached at one end to a stud C⁴ supported in a suitable bracket A² attached to the bed plate A. The free end of each spring plate C³ is pivotally-connected by a link C⁵ with the lower leaf of an elliptical spring C⁶ attached at its upper leaf at the middle thereof, to a bracket A³ supported from the bed plate A. This bracket A³ is slotted as plainly shown in Fig. 2, to accommodate the link C⁵ to prevent a longitudinal swinging motion of the latter. It will be seen that by this arrangement either of the hind wheels D or D', can readily pass over any obstruction in the road without causing the occupants to be jarred too much, in the wagon body, and without disturbing the relative connections with the driving mechanism.

The front wheels E are journaled loosely on the axles E', each attached on a vertically-disposed shaft E² held in a transversely-extending frame E³ mounted to slide and to turn in vertically-disposed guideways A' attached to the front end of the bed plate A. A spring E⁴ presses on each axle E', the said spring being coiled on the shaft E² and resting with its upper end on part of the frame E³; the lower end E⁵ of each shaft E² is made square to make proper connection with the turning mechanism, as hereinafter more fully described. The frame E³ supports a bolt E⁶ at or near its middle and this bolt is rigidly attached to the lower leaves of elliptical springs E⁷ fastened with their upper leaves to the top bar of the guideway A', as will be readily understood by reference to the drawings. An arm E⁸ engages the square end E⁵ of each shaft E², and the two arms E⁸ are connected with each other by a link E⁹, pivotally connected at F' with a curved lever F fulcrumed at F² on the frame E³. The free end of the lever F is pivotally-connected by a link F³ with a lever F⁴ fulcrumed at F⁵, on a bracket projecting from one side of the bed plate A, the upper end of the said lever being within convenient reach of the operator seated on the front seat B' in the wagon body B. The lever F⁴ is adapted to be locked in place on a segment F⁶, so as to hold the said lever in the proper position. Normally, the said lever F⁴ stands vertically and when in this position, the front wheels E are in alignment with the hind wheels D, D' and parallel with the longitudinal axis of the vehicle.

When the operator desires to steer the wagon to the left, he moves the lever F⁴ forward, as shown in Figs. 1 and 2, so that the lever F is caused to swing and by its connection with the link E⁹, and the arms E⁸ with the shafts E² causes the latter to turn so that the axles E′ swing simultaneously to throw the wheels E into an angular position, as will be readily understood by reference to Fig. 1. The wagon on its forward movement will now turn to the left. When it is desired to steer the wagon to the right the lever F⁴ is thrown backward so that the wheels E swing in the opposite direction to cause the vehicle to turn to the right. It will further be seen that by the above mounting of the wheels, they can readily pass over any obstructions in the road, as the shafts are free to slide upward in their bearings in the frame E³ and are returned to their normal positions by the springs E². It will also be seen that the frame E³ can swing on the bolt E⁶ and as the latter is yieldingly mounted on the elliptical springs E⁷, no jar whatever will be experienced by the passengers in the wagon body at the time the vehicle passes over a rough road.

On the inner ends of the rear axles C and C′ are secured the bevel gear wheels G and G′, respectively, in mesh with pinions G² journaled in a wheel G³ mounted to rotate loosely on the inner ends of the axles C and C′, as plainly shown in Fig. 1. This wheel G³ is provided on its peripheral surface with two gear wheels G⁴ and G⁵ of different diameters, and in mesh at all times with gear-wheels H and H′, respectively, mounted to turn loosely on the transversely-extending main shaft I, turning in suitable bearings erected on the bed plate A.

Between the gear wheels H and H′, is arranged a clutch H² mounted to slide on and to turn with the main driving shaft I, as will be readily understood by reference to Fig. 7. The clutch H² is adapted to engage clutch teeth on the hubs of the gear wheels H and H′, so that either of the latter can be coupled to the shaft I. The clutch H² is engaged by a shifting fork H³ held on a shaft H⁴, mounted to turn in suitable bearings on the under side of the wagon body B. The forward end of this shaft H⁴ is provided with an upwardly-extending arm H⁵, forming a handle adapted to be taken hold of by the operator seated on the front seat B′ of the wagon body B. The operator, by swinging the said arm H⁵ to the right or left, turns the shaft H⁴ so that the shifting fork H³ moves the clutch H² in mesh with the respective gear wheel H or H′, so as to connect the wheel G³ with the main driving shaft I.

The compensating gearing arranged on the inner ends of the axles C and C′ as above described, permits slip of either of the drive wheels D or D′ without affecting in any way whatever, the gearing connecting the shaft I with the wheel G³. The shaft I forms part of an engine of the type of locomotive engines, the said drive shaft being for this purpose provided at its ends with crank disks I′ connected in the usual manner with pistons in the cylinders J, the inlet valve of which, J′, is controlled by the operator on the front seat, so as to admit steam or cut off the same as desired. For this purpose, the valve stem of the said valve J′ is provided with an arm J² connected by a link J³ with an arm J⁵ projecting from a shaft J⁴ extending vertically at the front end of the wagon body B, so that the upper handle end of the said shaft J⁴ is under the control of the operator and can be readily turned by the same, so as to open or close the valve J′.

A reversing mechanism K of any approved construction is connected with the valve gear of the engines J and this reversing gear is controlled by a lever K′ extending with its forward end in front of the seat B′ so as to be also under the control of the operator. As this reversing gear is of any approved construction, no further description is deemed necessary.

The steam inlet pipe L for the valve J′ connects with a boiler N of any approved construction and arranged on the rear end of the belt plate A. This boiler is preferably of the Shipman style and utilizes oil as a fuel for generating steam. The water for the boiler N is conducted to the same by a pipe O connected with the water tank P arranged on the bed plate A near the front end of the same and under the wagon body B, as plainly shown in the drawings.

The oil is fed to the boiler N through a pipe Q leading from an oil tank R arranged in front of the water tank P. The exhaust from the cylinders J of the engine discharges into a coil of pipe S extending in the water tank P to finally discharge through the bed plate A to the outside as plainly shown in Fig. 2. Now, it will be seen that when the engines are working, the exhaust steam passes into the coil of pipe S, is condensed therein, the water of condensation flowing out through the lower end of the coil of pipe. The exhaust steam thus passing through the coil of pipe S heats the feed water contained in the tank P so that the feed water is delivered to the boiler N by the pipe O in a highly heated state. It is understood that the several pipes are provided with suitable valves for regulating the flow of the water, oil and steam, as the case may require.

It will be seen that when the valve is opened by the operator turning the arm J⁴, steam passes from the boiler N to the engines so that the latter rotate the driving shaft I, which by the respective gear wheel H or H′, actuates the compensating gearing so that the rear axles C and C′ are rotated to cause the wheels D and D′ to travel on the ground and thus propel the wagon forward. When it is desired to run the wagon backward, the operator actuates the lever K′ of the engine reversing mechanism, so that the engines turn the shaft I in an inverse direction, whereby the axles C and C′ are turned backward and revolve the wheels D and D′ in the same direction so that the wagon runs backward.

The steering is accomplished as above described by the operator actuating the lever F⁴, so as to change the position of the axles E' carrying the front steering wheels.

Having thus fully described my invention, I claim as new and desire to secure by Letters Patent—

1. A road wagon, comprising a bed plate, independent revoluble rear axles, rear drive wheels secured on the said rear axles, front steering wheels, front axles on which revolve the said front wheels, and a yieldingly mounted frame carrying the said front axles, substantially as shown and described.

2. In a road wagon, the combination with the vertical guide ways at the forward end of the wagon, of a transverse spring-supported frame mounted in said guide ways, and the short horizontally turning axles journaled in the ends of the said frame, wheels mounted on said axles, and means for simultaneously turning said axles, substantially as set forth.

3. In a road wagon, the combination with the vertical guide ways at the front end of the wagon and the vertically yielding spring supported transverse frame working in said guides, of the vertical shafts mounted in said frame and carrying short axles on which the steering wheel turns, the springs encircling said shafts above said axle and on which springs the ends of the transverse frame rest, substantially as set forth.

4. The combination with the vertical guide ways at the front of the wagon, elliptical springs E⁷ supported at their upper sections intermediate of the said guideways, and a vertically movable transverse frame working in said guide ways and connected to the lower members of said springs by a transverse bolt E⁶, of the short horizontally swinging axles mounted in the outer ends of the said frame and carrying the steering wheels, substantially as set forth.

5. In a road wagon, the combination with a spring, and a bolt secured thereon, of a frame hung on the said bolt, shafts mounted to turn in the said frame, axles projecting from the said shafts and carrying the steering wheels, springs pressing on the said shafts, and a lever and link mechanism under the control of the operator and adapted to turn the said shafts, substantially as shown and described.

6. In a road wagon, the combination with rear axles carrying the rear drive wheels, of a compensating gearing connected with the said axles, and differential gear wheels adapted to be thrown in gear with the said compensating gearing to rotate the said axle at a high or low rate of speed, substantially as shown and described.

7. The combination with the springs C³ secured at C⁴ to the sides of the wagon, of the transverse frame C² resting on the free ends of said springs and carrying the bearings for rear or drive wheel axles, the links C⁵ depending from the said springs, the elliptical springs C⁶ secured by their upper leaves to the sides of the wagon and having their lower leaves secured to the lower ends of said links, substantially as set forth.

8. In a road wagon, the combination with a bed plate, of springs supported thereon, links connected with the said springs, spring plates supported from the said bed plate and connected at their free ends with the said links, and a frame attached to the said spring plates and carrying the bearings for the rear axles, substantially as shown and described.

9. A road wagon comprising a bed plate, rear axles carrying the rear drive wheels and journaled on the said bed plate, a compensating gearing connected with the said rear axles, a differential gearing for driving the said compensating gearing at a high or low rate of speed, and engines carrying on their main driving shaft the said differential gear wheels, substantially as shown and described.

10. A road wagon comprising a bed plate, rear axles carrying the rear drive wheels and journaled on the said bed plate, a compensating gearing connected with the said rear axles, a differential gearing for driving the said compensating gearing at a high or low rate of speed, engines carrying on their main driving shaft the said differential gear wheels, and a reversing mechanism for the said engines to cause the main driving shaft to run forward or backward, substantially as shown and described.

11. A road wagon, comprising a bed plate supporting a wagon body, front steering wheels, rear driving wheels, a gearing connected with the axles of the said rear driving wheels, engines for actuating the said gearing, a boiler carried on the bed plate and generating steam for the said engines, a water tank for supplying the said boiler with water, and containing a coil of pipe connected with the exhaust of the said engines, and an oil tank connected with the said boiler to furnish the necessary fuel for the same, substantially as shown and described.

CLARENCE GILLETT.

Witnesses:
EZRA A. SUTLIFF,
NELSON H. ANIBAL.